Dec. 15, 1931.  S. G. HIRSCH  1,836,755
FISHING REEL
Filed Jan. 4, 1929  2 Sheets-Sheet 1
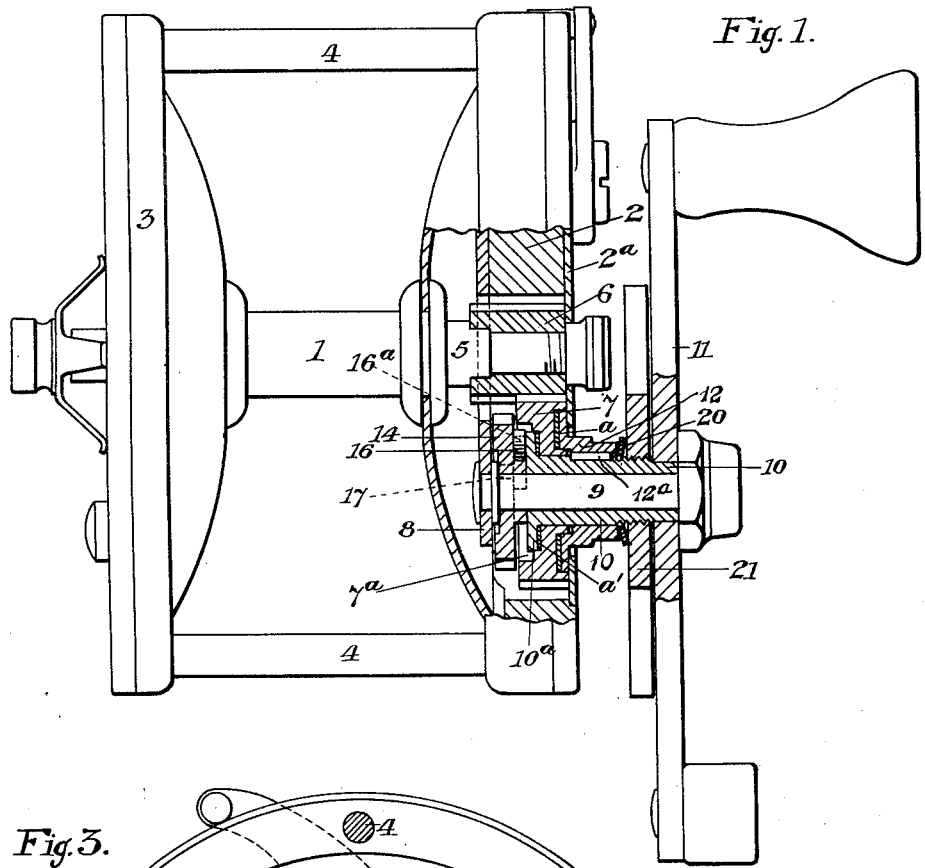
Fig. 1.
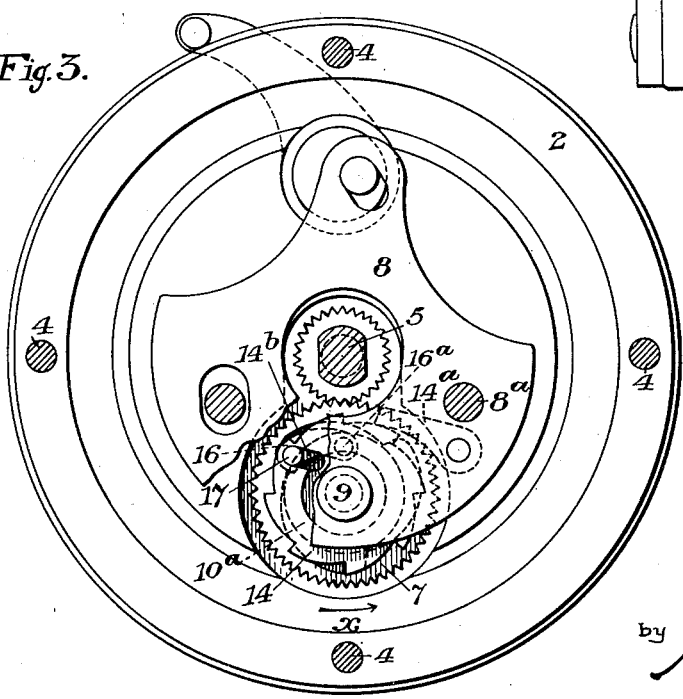
Fig. 3.
Fig. 4.
INVENTOR:
Stephen G. Hirsch
by Murray C. Boyer
Att'y.

Dec. 15, 1931.  S. G. HIRSCH  1,836,755
FISHING REEL
Filed Jan. 4, 1929   2 Sheets-Sheet 2

INVENTOR:
Stephen G. Hirsch

Patented Dec. 15, 1931

1,836,755

UNITED STATES PATENT OFFICE

STEPHEN GEORGE HIRSCH, OF PHILADELPHIA, PENNSYLVANIA, ASSIGNOR TO OCEAN CITY MANUFACTURING CO., OF PHILADELPHIA, PENNSYLVANIA, A CORPORATION OF PENNSYLVANIA

FISHING REEL

Application filed January 4, 1929. Serial No. 330,341.

My invention relates to drag mechanism for fishing reels, and my improvements have been applied to reels of the type employed by fishermen in the landing of game fish.

The main object of my invention is to provide a reel which will allow the fisherman to play the fish and at the same time allow him to retain full control of the line.

A further object of my invention is to provide a reel which will enable the fisherman to permit the fish to "play out" or "run away" with the line without motion of the reel handle or adjusting mechanism of the reel and at the same time give the fisherman full control of the reel immediately upon turning the handle.

A further object of my invention is to provide special release mechanism for the winding gears associated with the ratchet wheel employed with reels of this type.

These and other features of my invention are more fully described hereinafter; reference being had to the accompanying drawings, in which:

Figure 1 is an elevation, partly in section, of my improved reel.

Fig. 3 is an elevation of one of the end disks of the reel showing the spool driving mechanism, and Fig. 4 is a slightly enlarged view of pawl and ratchet mechanism employed in the structure forming the subject of my invention.

Figure 2:
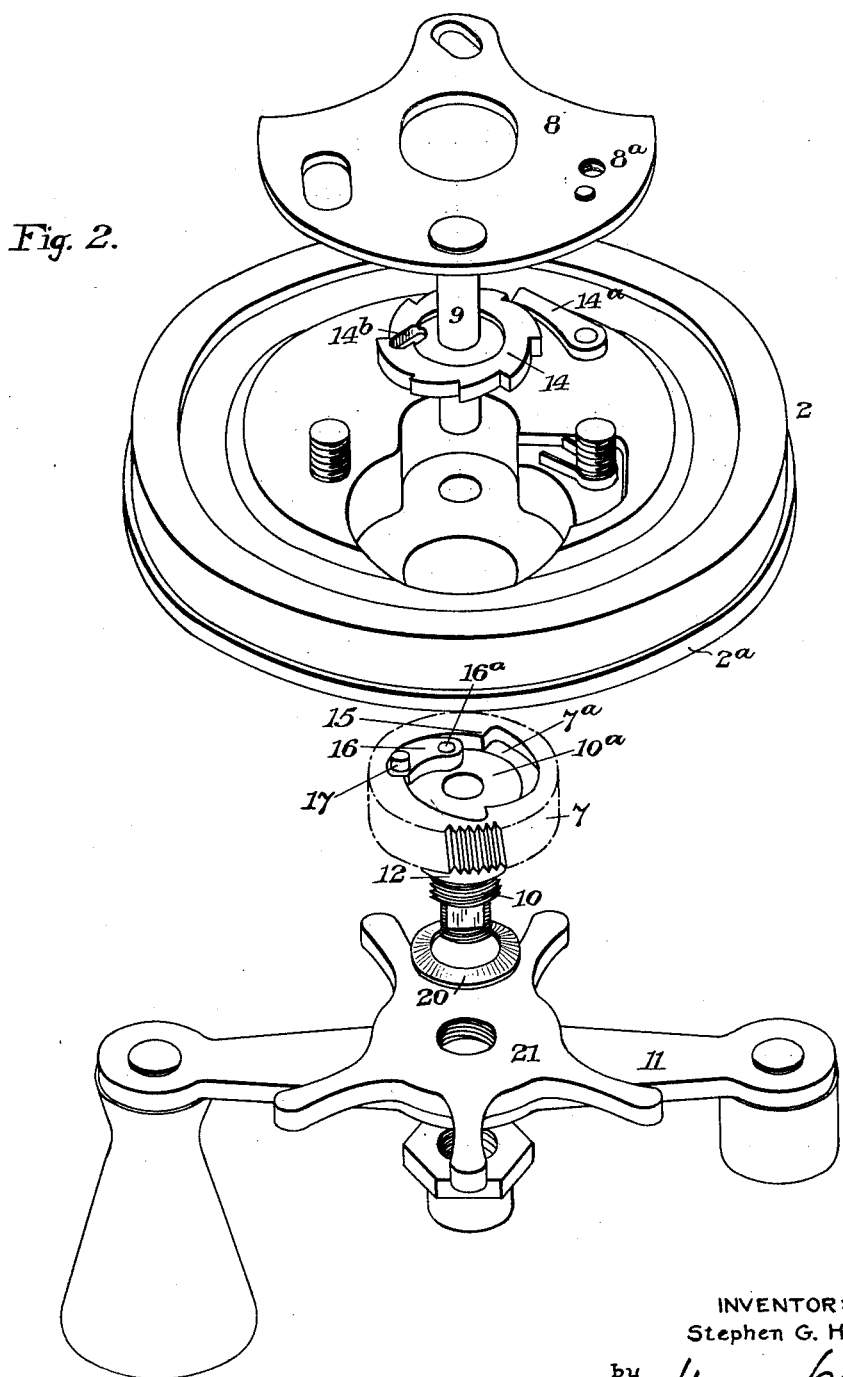
Fig. 2 is a perspective view of the reel elements in separated condition.

My improved reel includes a spool 1, journaled in side disks 2 and 3 which may be held together by posts 4. The spool 1 has a shaft 5 suitably juornaled in said disks which shaft carries a pinion 6, meshing with a driving gear 7, carried by a shiftable plate 8, pivotally mounted at 8ª on said disk 2. This plate may be operated in the usual manner common to reels of this type.

The plate 8 carries a stud 9 upon which is mounted a sleeve 10, which is connected at its outer end to an operating handle 11. The inner end of this sleeve carries the driving pinion or gear 7 meshing with the pinion 6, and such sleeve has a flange 10ª lying within a recess 7ª of said gear. An outer sleeve member 12, keyed at 12ª to the sleeve 10, is interposed between an outer portion or wall 2ª of the end disk 2 (which may be in two parts), and friction disks $a$ and $a'$ of suitable material, metal, felt, leather, or anything capable of performing the desired function, are interposed between said member 12 and the gear wheel 7 and between the latter and the flange 10ª of the sleeve 10. A ratchet wheel 14, provided with the usual spring pawl 14ª, is rotatably mounted on the stud 9, adjacent the inner side of the plate 8, and the hub of this ratchet wheel may contact with the flanged end 10ª of the sleeve 10.

The flanged end 10ª of the sleeve 10 fits within the recess 7ª of the gear 7, and the surface of what may be termed the inner annular wall of such recess is notched to form teeth 15, which may be engaged by a pawl 16 pivotally mounted at 16ª on the end of said flanged end. The free end of this pawl carries a pin 17, and such pin fits within an angularly arranged slot 14ᵇ formed in the ratchet wheel 14.

When the parts are moved in the direction of the arrow $x$, Fig. 3, after the plate 8 has been shifted to bring the pinion and gear into mesh, the pawl 16 will lie in engagement with a tooth 15 of the gear 7 and the reel winds up the line. Should a fish pull on the line, however, such movement transmitted from the pinion 6 to said gear wheel 7 will cause the latter to back up with reference to the ratchet wheel 14 and the walls of its slot 14ᵇ will act upon the pin 17 and move the pawl 16 out of engagement with a tooth 15, and the spool of the reel may run free or as free as the drag or friction means permit. To increase this drag I provide a cupped or spring washer 20 between the end of the member 12 and the star wheel 21, which is threaded on the sleeve 10 and has limited movement between said member 12 and the handle. Movement of said star wheel against the washer 20 will serve to press the member 12 against the washer $a$ and the gear wheel 7 against the washer $a'$, and increase the drag. Movement of said star wheel in the opposite direction will decrease the drag.

Should a fish pull on the line with a greater effort than that employed by the fisherman turning the handle to wind the reel the pawl 16 will be automatically disengaged as before stated, and the spool will unwind while the operator keeps his hand on the crank. As long as the fish continues to exert greater effort than the winding effort it is able to pull out the line to which more or less drag may be applied. The moment the fish begins to tire out or the fisherman determines to put extra winding power into play the pawl 16 is automatically reengaged with a tooth 15 by the action of the slotted ratchet wheel and the fish may be drawn in toward the fisherman. By this means the fisherman can play a fish until tired out without danger of breaking the line.

I claim:

1. Drag and free spool fishing reel mechanism including a reel shaft carrying a spool, a pinion on said shaft, a gear for driving said shaft through engagement with said pinion, a sleeve on which said gear is mounted, friction means between said gear and sleeve, a crank lever for turning said sleeve, and a swinging pawl carried by said sleeve for operatively connecting the same with said gear; said parts being disconnectible permitting the spool to run free upon the line being drawn out by a fish without movement of the crank lever.

2. Drag and free spool fishing reel mechanism including a reel shaft carrying a spool, a pinion on said shaft, a gear for driving said shaft through engagement with said pinion, a sleeve on which said gear is mounted, friction means between said gear and sleeve, a crank lever for turning said sleeve, a swinging pawl carried by said sleeve for operatively connecting the same with said gear, and a star wheel carried by said sleeve to react upon said friction means and increase the drag.

3. Drag and free spool fishing reel mechanism including a reel shaft carrying a spool, a pinion on said shaft, a gear for driving the shaft through engagement with said pinion, a sleeve on which said gear is mounted, friction means between said gear and sleeve, a crank lever for turning said sleeve, clutch means including a swinging pawl carried by said sleeve; said gear having a recess provided with teeth for engagement by said pawl to provide an operative connection between the sleeve and gear, and means for automatically releasing said pawl when the spool is turned in a direction to pay out line.

4. Drag and free spool fishing reel mechanism including a reel shaft carrying a spool, a gear for driving the shaft, a sleeve on which said gear is mounted, friction means between said gear and sleeve, a crank lever for turning said sleeve, clutch means including a swinging pawl carried by said sleeve; said gear having a recess with teeth on its wall engaged by said pawl for operatively connecting the sleeve and gear, a star wheel on the sleeve to react upon said friction means to increase the drag, and a spring washer on the sleeve engaged by said star wheel.

5. Drag and free spool fishing reel mechanism including a reel shaft, a pinion on said shaft, a gear for driving the shaft through engagement with said pinion, a sleeve on which said gear is mounted, friction means between said gear and sleeve, a crank lever for turning the sleeve, a ratchet wheel having an angular slot, means for holding said ratchet against movement in one direction, a swinging pawl carried by said sleeve and disposed between said ratchet wheel and gear, and a pin carried by said pawl disposed in the angular slot of the ratchet wheel; said pawl being operatively connected to said ratchet wheel through said pin and slot and being movable out of engagement with the gear when the spool is turned in one direction upon the line paying out and automatically engaging the gear when the handle is operated to turn the spool and wind the line.

6. Drag and free spool fishing reel mechanism including a reel shaft, a pinion on said shaft, a gear for driving the shaft through engagement with said pinion, a sleeve on which said gear is mounted, friction means between said gear and sleeve, a crank lever for turning the sleeve, a ratchet wheel having an angular slot, means for holding said ratchet against movement in one direction, a swinging pawl carried by said sleeve and disposed between said ratchet wheel and gear, a pin carried by said pawl disposed in the angular slot of the ratchet wheel; said pawl being operatively connected to said ratchet wheel through said pin and slot and being movable out of engagement with the gear when the spool is turned in one direction upon the line paying out and automatically engaging the gear when the handle is operated to turn the spool, and means including a spring washer and a compression member carried by the sleeve for increasing the drag.

7. Drag and free spool fishing reel mechanism including a reel shaft, a pinion carried thereby, a gear arranged to mesh with said pinion whereby said shaft may be driven, a sleeve upon which said gear is mounted, releasable means operatively connecting said sleeve and gear; said releasable means including a pawl mounted in a recess of said gear and teeth carried by said gear for engagement by said pawl, a ratchet wheel journaled on said sleeve; said ratchet wheel having an angularly arranged slot and said pawl having a pin fitting said slot, and a handle for turning said sleeve and with it the gear and the ratchet wheel operatively connected together by said pawl.

8. Drag and free spool fishing reel mechanism including a reel shaft, a pinion carried thereby, a gear arranged to mesh with said pinion whereby said shaft may be driven, a sleeve upon which said gear is mounted, friction means between said gear and sleeve, releasable means operatively connecting said sleeve and gear; said releasable means including a pawl carried by said sleeve and mounted in a recess of said gear and teeth carried by said gear for engagement by said pawl, a ratchet wheel journaled on said sleeve; said ratchet wheel having an angularly arranged slot and said pawl having a pin fitting said slot, a handle for turning said sleeve and with it the gear and the ratchet wheel operatively connected together by the pawl carried by said sleeve, a spring washer on the sleeve, and a star wheel mounted on said sleeve to react upon the friction means through said spring washer to increase the drag between said parts.

In witness whereof I have signed this specification.

STEPHEN GEORGE HIRSCH.